Figure 3:
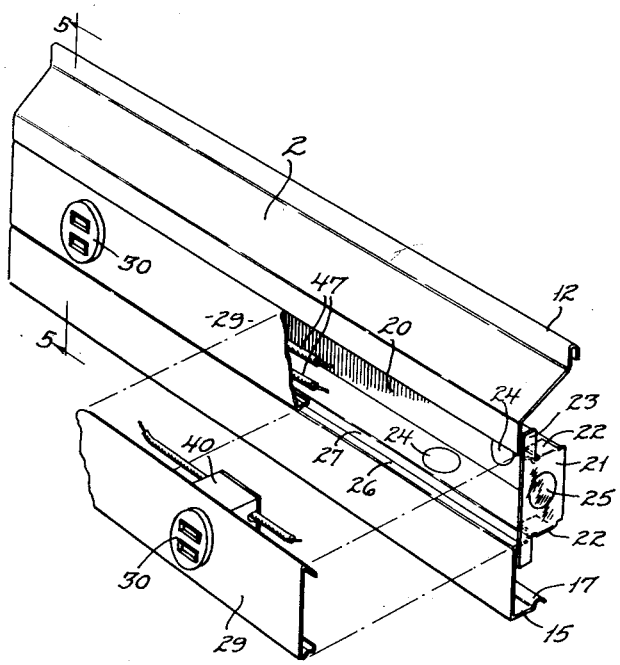

Oct. 11, 1938.    H. S. CURREN    2,132,400
ELECTRICAL WIRING SYSTEM FOR BUILDINGS
Filed Dec. 5, 1936    2 Sheets-Sheet 1
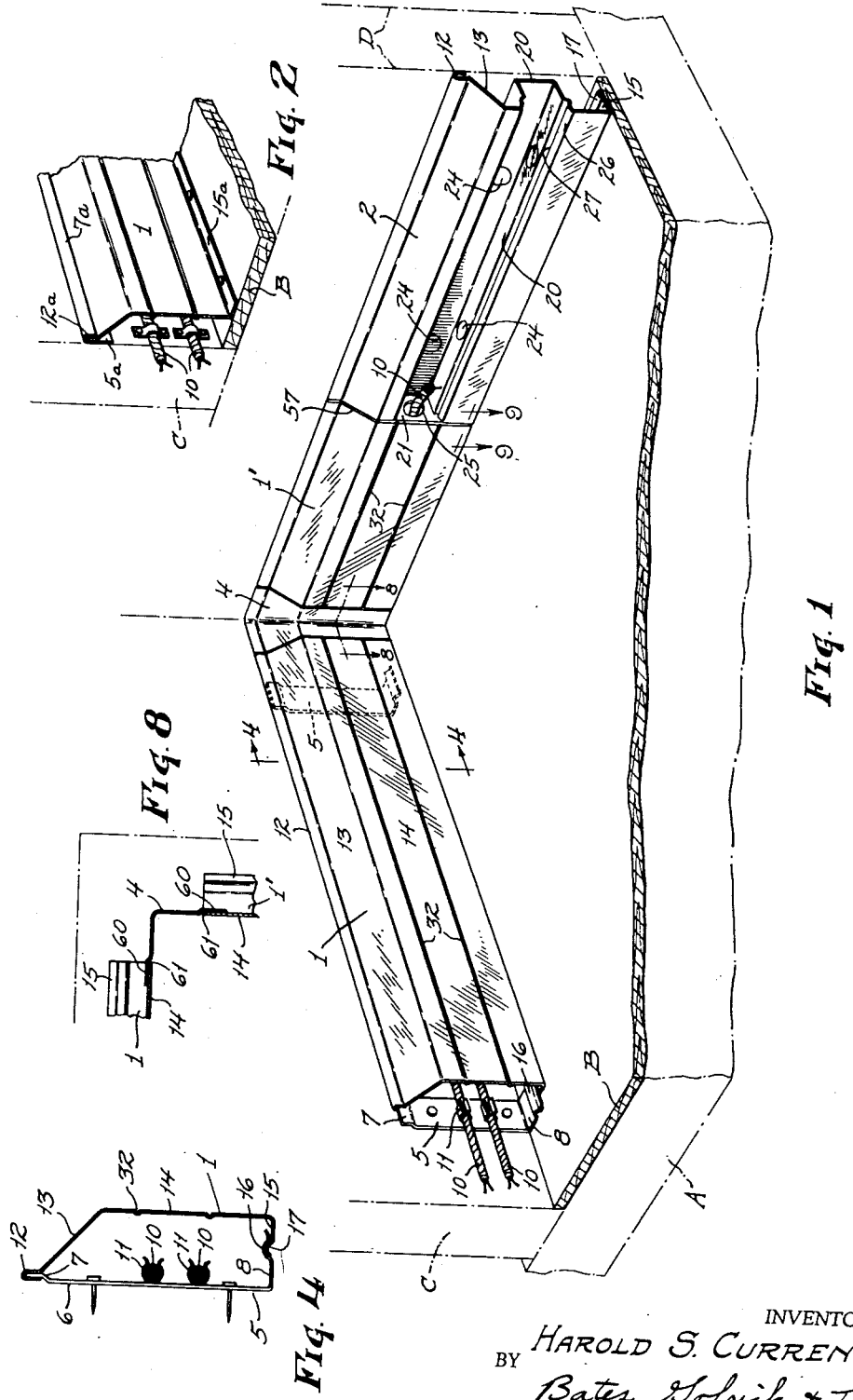
INVENTOR.
HAROLD S. CURREN
BY Bates, Golrick, & Teare
ATTORNEYS Oct. 11, 1938.  H. S. CURREN  2,132,400
ELECTRICAL WIRING SYSTEM FOR BUILDINGS
Filed Dec. 5, 1936   2 Sheets-Sheet 2

INVENTOR.
BY HAROLD S. CURREN
Bates, Golrick, & Teare
ATTORNEYS

Patented Oct. 11, 1938

2,132,400

UNITED STATES PATENT OFFICE 2,132,400

ELECTRICAL WIRING SYSTEM FOR BUILDINGS

Harold S. Curren, Rochester, N. Y., assignor to The Curren Fabrihome Corporation, Willoughby, Ohio, a corporation of Delaware Application December 5, 1936, Serial No. 114,377

6 Claims. (Cl. 247—37)

This invention relates to an improvement in electrical service wiring for buildings, and particularly those in which it is inconvenient or impossible to run conductor wires through floors between joists and between studs in walls. The principal object is to provide a new and improved method of installing electrical wiring in buildings.

Another object is to provide a method of electrically wiring buildings, wherein all the essential wiring can be installed after the building is completely constructed, to the end that the electricians will never have to interfere with workmen engaged in the building construction.

A further object is to provide a system of electrical wiring for buildings, characterized by the capability of being easily and economically remolded or altered by relatively unskilled persons and without interference with the essential building construction.

A further object is to provide a wiring system in which substantially all the essential conductors, including main feed and lead-off wires or their equivalent, are concealed behind or within hollow base boards or mouldings in such manner that the system will conform to accepted safety standards and the required regulations, and provide for the placing of any desired number of outlets in a great variety of positions.

A further object is to provide a new and economical method of housing and installing electrical service conductors, wherein outlet units may occupy any selected positions in a given region of a room, afford as many individual outlets as may be desired, and be relatively simple to install and inspect.

A further object is to provide a sectional sheet-metal molding structure for concealment of electric conductors, wherein certain sections function as outlet or knock-out boxes and other sections as concealing means only, and wherein all sections may be easily and cheaply made, as by rolling or pressing, without requiring expensive drawing operations on the sheet-metal.

A specific object is to provide a receptacle or outlet unit, in the form of a base board or moulding, which serves effectively as a continuous knock-out box in making connections with main circuits and providing as many outlets as desired.

Still another object is to provide an improved and simplified insulated socket for use in connection with conventional service plugs.

Other objects and features of the invention will become apparent from the following description relating to the accompanying drawings, which show the preferred forms. The essential characteristics are summarized in the claims.

Figure 5:
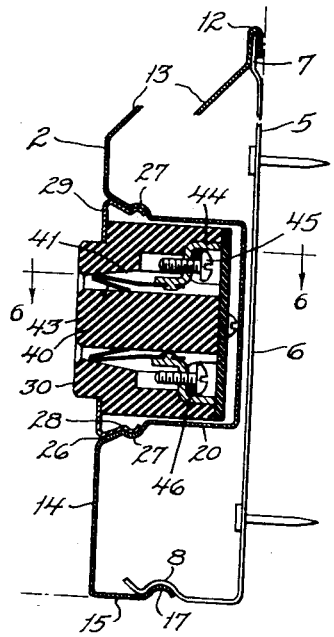
Figure 6:
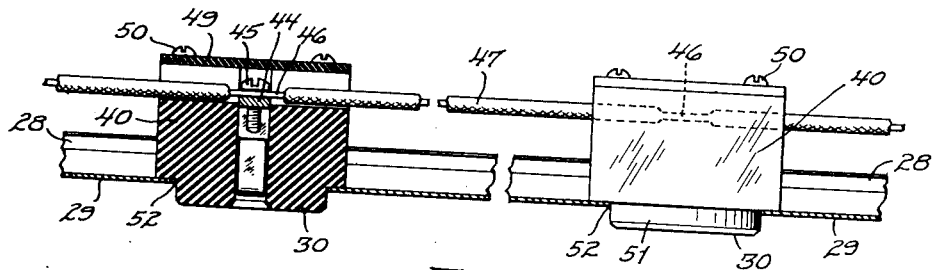
Figure 7:
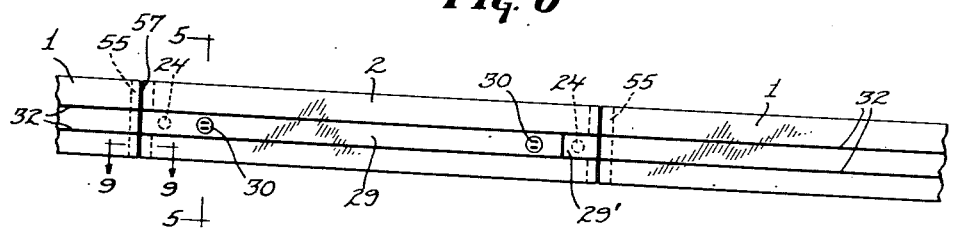
Figure 9:
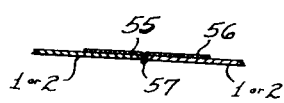

In the drawings, Fig. 1 is a perspective view in which illustrative portions of adjoining building walls and a floor are shown diagrammatically, together with illustrative portions of plain and electrical base board construction of the present system; Fig. 2 is a perspective view in which a modified construction of plain base board is shown; Fig. 3 is a fragmentary perspective view, illustrating details of construction of an electrical base section, part of the structure being out of normal position; Figs. 4 and 5 are transverse sectional views as indicated by the lines 4—4 and 5—5 on Figs. 1 and 3 respectively; Fig. 6 is a detail sectional view, taken on a horizontal plane, as indicated by the lines 6—6 on Fig. 5; Fig. 7 is a side elevation of a base board, showing both plain and electrical sections, and Figs. 8 and 9 are detail horizontal sections, taken as indicated by the lines 8—8 and 9—9 on Figs. 1 and 7, respectively.

The system is especially designed for use with skeleton frame buildings, which incorporate monolithic floors, ceilings and supporting columns in the planes of the walls. Such a building construction is shown in my prior application, Serial No. 107,931, filed October 28th, 1936. This is representative of a type of construction, the use of which is rapidly increasing. In the system shown in said application, the floors (or large sections thereof in larger buildings) are cast in one piece, and the walls and partitions are made up of panel units or sections of sizes which are convenient to handle in installation. Obviously, it is impractical to lead service wires through such floors and into the wall units or through monolithic columns if such are in the plane of the wall. The wiring system disclosed herein permits substantially all the necessary conductors and (e. g.) base outlets to be economically placed after the floors, ceilings, walls and partitions are erected, and affords other advantages as will later be shown.

Referring to Fig. 1, A indicates the floor and B a suitable floor covering, such as linoleum or (e. g.) wood flooring laid in mastic. Vertical walls are diagrammatically indicated at C and D. As shown, the floor covering extends into substantially abutting relationship to the vertical walls and the base board construction hereof may be erected over such covering.

In Fig. 1, a plain base section is indicated at 55

1, and an electrical base section at 2. A shorter plain base section (identical in construction with 1), is shown at 1'. A corner piece 4 connects the two plain base sections. The sections are shorter than would actually be used, i. e., shortened for clearness of illustration. Both the plain and electrical base sections are designed to be fastened to the wall by means of brackets which are positioned at suitable intervals along the respective walls, as shown at 5. These brackets are provided wherever two sections join and at appropriate intervals between joints. The sections are preferably made of sheet-metal, say of .028" and .040" cold rolled steel for the plain and electrical base sections respectively and their upper and lower portions have the same cross sectional contour, except for the slight difference in thickness. Both types of base sections may therefore be fastened with the same size of brackets.

Referring particularly to Figs. 1 and 4, the brackets preferably comprise comparatively narrow strips of light sheet-metal having a fair amount of spring. As shown, each has an upright portion 6 adapted to be fastened in face to face contact with the wall, as by screws or other appropriate fasteners. The upper end portions of the brackets stand out slightly from the wall, providing tongues 7, and the lower ends 8 are bent outwardly and may initially lie on the floor or floor covering B. These are fashioned to clasp the lower edges of the base sections as will later be described.

Main feed conductors (BX, Romex, etc., cables) are shown at 10, Figs. 1 and 4. Wherever these pass behind the plain base, they are carried by the brackets 5 on suitable spring clasps 11, fastened to the brackets as by welding.

In order to detachably secure the base sections 1 and 2, to the brackets, the upper edges of these sections are openly folded, as at 12, to receive the tongues 7 of the brackets. The sections have upper walls 13 (plain or of any desired moulding form), vertical walls 14, and inwardly turned bottom flanges 15. The bottom flanges cooperate with the outwardly extending portions 8 of the brackets in a manner to detachably interlock the base sections and brackets. For example, the members 8 may have downwardly facing rounded channel effects 16, adapted to receive complementary ribs 17 formed on the flanges 15. By this arrangement the formation 12 may be hooked over the tongues 7 of the brackets and the lower edges of the section then swung downwardly and toward the wall, and snapped into place by camming the spring tongues 8 upwardly.

An alternative construction for mounting the base sections is shown in Fig. 2, wherein 5a designates a strip which is screwed, nailed or otherwise fastened to the wall, the strip having a down-turned flange or hook effect 7a. The upper walls of the base sections have upstanding flanges 12a, adapted to be tucked behind the flanges 7a, whereupon outward flanges 15a at the lower edges of the base sections may be fastened to the flooring as by tacks or screws. In this event clasps or strap fastenings for the conductor cables 10 may be secured directly to the building walls. Due to the fact that certain floor covering materials have a tendency to "walk" and disturb the bottom fastenings, the arrangement in which the sections snap into place is preferred.

Referring now particularly to Figs. 3 and 5, the construction of the electrical base section is very similar to that of the plain section, except for the heavier gauge of metal above mentioned, and the vertical walls 14 are deeply indented to form substantially rectangular longitudinal channels 20. These run the entire length of the electrical sections.

It will be seen that both styles of sections 1 and 2 comprise essentially hollow moulding members each with the same cross sections from end to end. Such sections may be very easily and cheaply made without requiring expensive drawing operations. Either form may be made by rolling and either by simply bending the metal without having to draw it.

The electrical base sections 2 may be closed at their ends by separate closure members 21, (see Fig. 3), having top and bottom flanges 22 adapted to overlap the upper and lower walls of the channels and be secured thereto, as by welding. The closure members may also have extension wings 23 against which adjacent base sections 1 abut. Knock-out discs may be provided in the rear top and/or bottom walls of the channels as shown at 24 (see also Fig. 7) and in both end wall members 21, one being illustrated at 25. This construction results in that each electrical base section becomes a continuous knock-out box on which any number of outlets may be mounted as will now be shown.

Referring to Figs. 3, 5 and 7, the face of each channel 20 is adapted to be closed by a snap-on cover strip 29. To this end the horizontal walls of the entrances to the channels are beveled as at 26 with longitudinal indentations 27; and the snap-on cover strips 29 have flanges 28 which are substantially complementary to the entrance surfaces of the channels. The covers carry insulated socket devices 30. The socket devices may be permanently mounted on the covers and furnished complete with the necessary conductor wires, to make connection with the main leads. These leads pass into the knock-out box provided by the channels 20 and end walls 21, through one of the knock-out holes (note right hand portion of Fig. 1). The knock-out holes 24 in the backs of the channels are used when the leads pass directly from the building wall instead of running along the hollow base construction.

For the sake of appearance, the plain base sections may be slightly indented, as at 32, (see Figs. 1 and 7) to simulate the channel-effects in the electrical base sections when closed by the snap-on cover strips.

Referring specifically to Figs. 5, 6 and 7, the socket members there shown comprise one-piece insulation bodies 40 with paired through openings 41 which contain spring contacts 43 for cooperation with the usual prongs of a service plug. The spring contact members 43 have folded spring ends lying within the through openings and their shanks are secured to anchors 44 of Z bar shape, which lie in appropriate enlargements of the through openings. The anchors carry screws 45 which lie parallel to the ends of the anchors so that their heads may clamp bared portions 46 of insulated wires 47 against the anchors. The wires lie in parallel troughs which intercept the through openings 41 at the location of the anchors. The bared wire is embraced between an inner corner of the Z bar shaped anchor and the screw head, so that a full electrical connection is assured. At the back, the troughs 48 are closed by an insulation plate 49, secured as by a pair of screws 50 to the insulation block. When the insulation plate 49 is applied, the same abuts the free ends of both anchors 44, thereby holding the anchors, and the springs contacts carried thereby, snugly in position. The exposed circular outer ends 51 of the blocks 40 may be held by friction in circular openings 52 in the snap-on cover strips.

As shown in Fig. 7, the electrical base section 2 is provided with two insulated receptacles 40, and it will be understood that sufficient wire 47 is provided to connect with the leads of the cable 10 extending through the end hole in the knock-out box structure provided by the electrical base. Thus, a section of cover 29 and appropriate number of sockets and connecting wires form outlet units of any desired length, and with as many outlets for base receptacles as may be desired. For example, I may provide two sockets in the snap-on cover for each two-foot electrical base section, three in the cover for a four foot base section, four in a six foot section, and so on. The snap-on cover strips which carry the receptacles do not extend the full length of the base sections 2, but stop a short distance from one end as shown in Fig. 7. The remainder of the opening in each case is closed by a short snap-on strip section 29'. These provide openings, whereby the connections between the cables and the wires 47 may be inspected at any time, and also provide for facilitating the removal of the longer strips by exposing one end of these strips. It is an easier matter to pry out the channel-engaging flanges of long strips when one end is exposed, as will be obvious.

In order to finish joints between base sections, and prevent relative offsetting of the outer walls of adjacent sections, light metal inserts, such as shown at 55 in Figs. 7 and 9, may be used. These inserts have oppositely extending flanges 56 which inwardly overlap both sections for their full height and have substantially the same contour as the plain base sections 1. Thus, they may be snapped onto the brackets 5 in the same manner as the base sections are mounted thereon. As shown in Figs. 7 and 9, the members 55 have ribs 57, which space the sections apart slightly and form a finishing bead effect, extending slightly beyond the outer faces of the sections. In case of the electrical base sections, parts of the flanges 56 may be omitted so as to clear the channels 20.

None of the sections are designed to turn corners, and in order to close inside or outside corners, the members 4, Fig. 1, are made with substantially the vertical cross-sectional contour of the base sections and have flanges 60 which underlap the adjacent ends of the sections 1 or 2. As shown in Fig. 8, the flanges include shoulders 61, which the ends of said sections abut. These corner members 4 may be placed against the walls before the base sections are attached to the brackets 5, and after such attachment the corner members will be securely held in place by the sections. Only the inside corner member is shown; an outside corner member being made on exactly the same principles, but bent in the reverse direction.

Referring further to the cables or conductors 10 which run through the base sections, it is contemplated that, where such cables run along the spaces above or below the channels 20 of the electrical bases, fasteners for the cables may be supported directly on the building wall or located high enough or low enough on the brackets so that the cables and fasteners will clear the channels. Preferably ordinary strap fasteners (not shown) are provided in such cases for fastening the cables directly to the wall.

It will be seen that the base board sections are installed with the complete electrical feeding system behind them, and that additional electrical base sections may be installed at any time with any desired number of sockets. This merely requires supplanting plain base with electrical base, cutting out sections of cable 10 and supplanting the same with the wires which are carried on the snap covers. In other words if service is to extend past an electrical base section, then both ends of each conductor wire 47 are connected with leads from a severed cable 10, the latter entering the channel 20 through respective knock-out holes in the end members 20. It will also be seen that the system accomplishes the various objectives, hereinbefore outlined, in an efficient and practical manner.

I claim:

1. An electric service system for buildings, wherein hollow moulding sections conceal the main electric leads or cables, said sections each being adapted to be made of one piece and of uniform cross-section from end to end as by rolling or bending, one of the sections having an integral relatively inset portion within its borders, providing a reception space for electrical outlet connections, frangible means closing the ends of said reception space, and means adapted to support outlet fixtures, the latter means outwardly closing at least a portion of said reception space.

2. In a system of the class described, the combination of a sheet-metal section of substantially uniform construction throughout its length, said section having an inset portion providing a channel, frangible end closures for the channel for the reception of conductors, and a plate adapted to support outlet devices, said plate being detachably associable with the said section by spring means.

3. In an electric service system for buildings, a plurality of brackets of operatively identical form adapted to be mounted in spaced positions on a wall of such building, hollow molding sections adapted to be interlocked interchangeably with the brackets in a manner to conceal main electric leads or cables passing along such wall from bracket to bracket, another molding section, comprising a channeled member which is sufficiently similar in shape to the aforesaid molding sections, so that it may be interlocked with respective said brackets interchangeably with the first mentioned hollow sections to continue the molding effect provided thereby, the channeled member being adapted and arranged to provide a knock-out box, and means adapted to support outlet devices, said means detachably closing the channel.

4. In a system of the class described, a plurality of moulding sections mountable interchangeably on a wall, said sections including a sheet metal moulding section having substantially the same transverse shape throughout its length, said section having an inset portion providing a channel extending longitudinally of the section leading inwardly from its front face, separate means effectively closing the ends of the channel and having removable means adapted partially to open such ends for the reception of conductors into the channel from other sections of the system, a plate adapted to support outlet devices, and means detachably connecting the plate to said section in a manner to outwardly close the channel.

5. In a wiring system for buildings, shell-like molding sections which are adapted for attachment to a wall in end-to-end relationship, certain of the sections acting only as covers to conceal wires, other sections being relatively indented intermediately of their longitudinally extending edges in a manner enabling the indented portions to serve as continuous knock-out boxes, and removable covers which outwardly close the indentations, said covers being arranged and adapted to support service outlets such as insulated sockets.

6. In a wiring system for buildings, a sheet metal molding section which is rearwardly recessed intermediately of its longitudinally extending edges lengthwise thereof in a manner enabling the walls of the recess to serve as a continuous knock-out box, and a cover plate arranged and adapted to support and expose for operation one or more service outlets such as insulated sockets, which plate snaps onto the section in a manner to close the recess on the exposed face of the section.

HAROLD S. CURREN.